United States Patent [19]

McDowall et al.

[11] 4,239,839
[45] Dec. 16, 1980

[54] MULTI-CELL BATTERIES

[75] Inventors: William L. McDowall, Glen Waverley; Alan K. Maplesden, Kew, both of Australia

[73] Assignee: Dunlop Australia Limited, Melbourne, Australia

[21] Appl. No.: 43,822

[22] Filed: May 30, 1979

[30] Foreign Application Priority Data

May 31, 1978 [GB] United Kingdom ............... 25532/78

[51] Int. Cl.³ .......................................... H01M 2/24
[52] U.S. Cl. ................................ 429/154; 429/160; 429/161
[58] Field of Search ............... 429/149, 154, 150, 152, 429/153, 158, 156, 159, 160, 9, 161

[56] References Cited

U.S. PATENT DOCUMENTS

| | | | |
|---|---|---|---|
| 2,066,010 | 12/1936 | Lindem | 429/156 |
| 2,616,937 | 11/1952 | Kullgren | 429/9 |
| 3,844,841 | 10/1974 | Baker | 429/155 |
| 4,022,951 | 5/1977 | McDowall | 429/149 |

FOREIGN PATENT DOCUMENTS 2329726 11/1974 Fed. Rep. of Germany ............ 429/9

*Primary Examiner*—Donald L. Walton
*Attorney, Agent, or Firm*—Schuyler, Banner, Birch, McKie & Beckett

[57] ABSTRACT

A multi-cell battery constructed of a plurality of frames of insulating material each frame having a number of active battery material areas arranged side by side with a division portion between each material area, the frames being arranged side by side in a direction normal to the plane of the frame with the division portions secured in sealed relation to form partitions between adjacent cells of the battery. The active battery material in respective areas being selected so that adjacent areas in each frame are of opposite polarity and adjacent areas in adjoining frames are of opposite polarity. A barrier frame interposed between and secured to two frames in the assembly forming a chemical and electrical barrier between the active battery material in frames on opposite sides of the barrier member so that the assembly of frames forms two batteries of equal nominal voltage.

3 Claims, 4 Drawing Figures

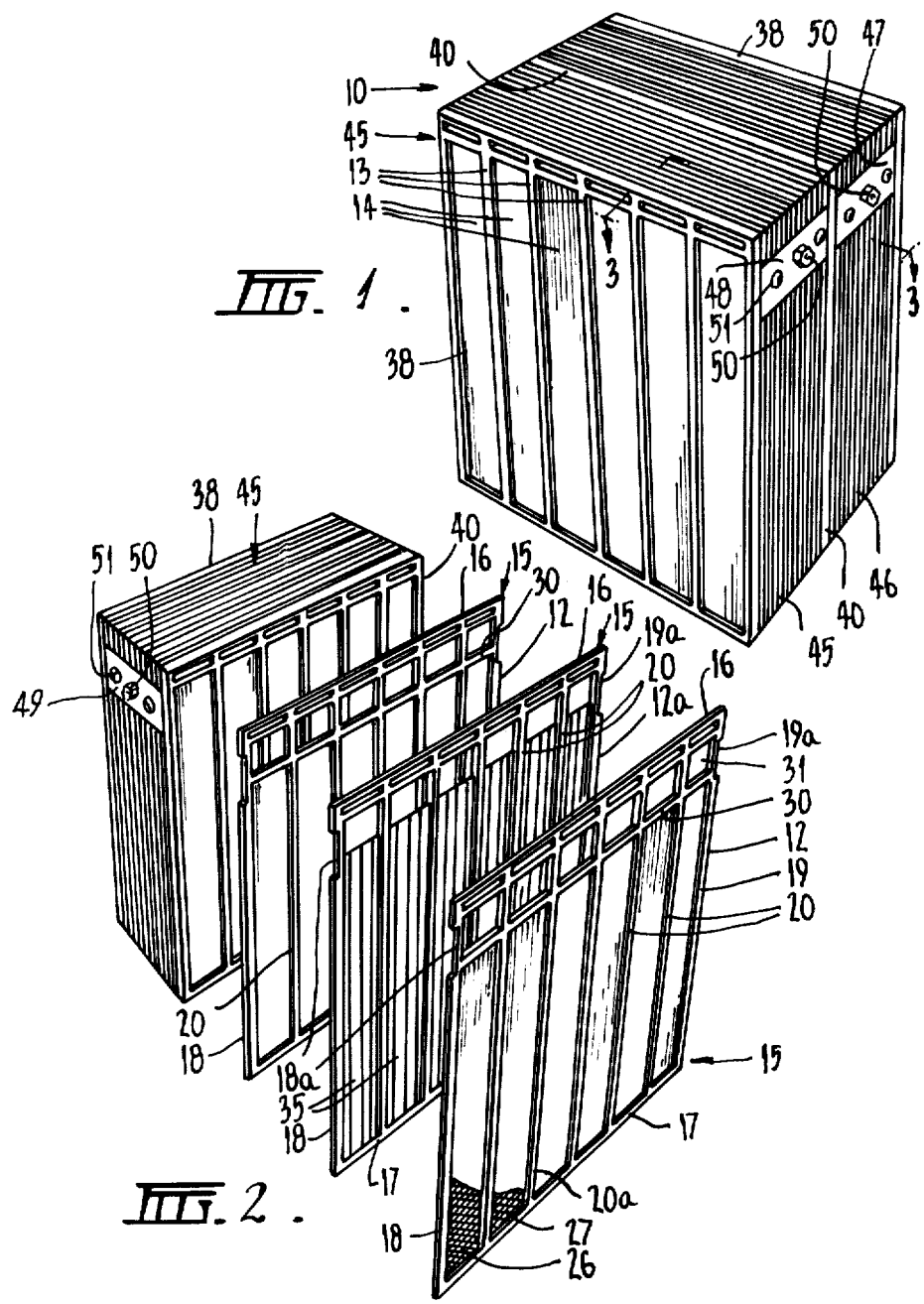

MULTI-CELL BATTERIES

This invention relates to a multi-cell battery and to an electrical energy supply system of a motor vehicle incorporating a multi-cell battery.

One of the major, if not the major, use of multi-cell batteries is in motor vehicles where the battery provides electrical energy for the starting of the engine, for the ignition of the engine when running, and for a wide range of accessories. However in the current design trends in vehicles, particularly private cars, a prime requirement is to reduce the on-the-road weight of the vehicle. There is thus a continuing demand to reduce the physical size of auxiliary components, which in itself is a saving in weight, and also enables the size of the vehicle to be reduced with a further saving in weight.

The conventional lead-acid battery as used in motor vehicles is a significant weight and space factor in a vehicle, however the desirability to reduce the size of the battery is in conflict with the increasing electrical energy demand of modern vehicles. This increased demand principally arises from the number of electrically operated mechanisms, window winders, seat adjusters, rear window heaters, air heaters and conditioners etc., currently fitted to vehicles. The problem is further aggravated by the fact that these mechanisms can be, and frequently are, operated when the engine is not running and thus the battery is the only source of electrical energy.

Therefore the battery must have sufficient capacity to permit the normal use of the various electrical mechanisms when the engine is not running, and yet retain a reserve of energy adequate to operate the starter motor and ignition to restart the engine.

The use of automatic transmissions in vehicles also influences the battery requirement, as use of the starter motor is the only manner of starting the engine. An automatic transmission will not transfer the motion of the vehicle wheels to the engine and so the vehicle cannot be pushed, towed, or rolled down an incline to start the engine when the battery has insufficient stored energy to operate the starter motor and ignition.

There is proposed in British Pat. No. 1,515,688 a multi-cell battery construction which enables a battery of the required capacity for vehicle use to be produced that is smaller and lighter than batteries of comparable capacity currently in use. In addition material and production costs are reduced.

The multi-cell battery disclosed in said British Patent is constructed of a plurality of frames of a mouldable material which is electrically insulating at the intended operating voltage of the battery and is inert to the active materials of the battery and any material produced during operating of the battery, each frame defining a plurality of separate material receiving areas arranged in side by side relationship across the width of the frame. Each of the frames includes portions forming divisions between adjacent support areas of the frame, and the frames are arranged in a side by side relationship in a direction normal to the width of the frame, with the portions of each frame forming the divisions between adjacent receiving areas secured in a sealed relationship to the corresponding portions in adjacent frames to form partitions between adjacent cells of the battery. The support areas of each frame carry individual masses of active battery material so that each support area forms a plate of the battery. The active battery material in respective areas being selected so that adjacent areas in each frame form plate of opposite polarity and adjacent areas in adjoining frames form plates of opposite polarity. Electrolyte porous separator members are interposed between areas of active material of opposite polarity in adjoining frames. The battery described in this paragraph is hereinafter referred to as "the type hereinspecified".

In a battery of the type hereinspecified the number of cells in the battery and hence the rated voltage of the battery is determined by the number of support areas in each frame. The capacity of the battery is consequently determined by the number of frames assembled in a side by side relationship. In contrast in previously known constructions of multi-cell batteries the casing was moulded with a fixed number of cells the voltage of the battery being determined by the number of said cells. Each cell received an assembly of plates the amp/hour capacity of the battery being determined by the size and number of plates in the assembly.

It is the principal object of the present invention to provide a modification of the multi-cell battery of the type hereinspecified that will render that battery most advantageous in many applications including the application to motor vehicles.

With this object in view there is provided according to this invention a multi-cell battery of the type hereinspecified wherein there is interposed between and secured to two frames in the assembly of frames, a member forming a chemical and electrical barrier between the active battery material supported by frames located on opposite sides of said member.

Conveniently the member, hereinafter referred to as "the barrier member", may be in the form of a barrier frame having the same basic shape as the frames of the assembly supporting the active battery material, but with the area bound by the frame completely closed by a material that will form the required electrical and chemical barrier. Preferably the barrier frame and the material forming the barrier are an integral moulding.

It is preferred that the barrier frame is of the same shape as the frames of the assembly including portions dividing the barrier frame into a plurality of side by side areas corresponding to the support areas of the frames carrying the active battery material. The side by side areas of the barrier frame are each spanned by a sheet of material formed integral with the barrier frame including the dividing portions. When this form of barrier frame is incorporated into the assembly of frames of the battery, the dividing portions of the barrier frame register with the division portion of adjacent frames carrying the active material and are secured in sealed relation thereto, to form part of the partitions between adjacent cells of the battery.

If the barrier frame does not include dividing portions the barrier frame must otherwise be secured in sealed relation to the division portions of the frames carrying the active material and immediately adjoining the barrier frame on either side thereof.

The provision of the member forming the barrier between selected frames of the assembly of frames results in the assembly of frames which would normally form a battery of a given nominal voltage being divided into two batteries of the same nominal voltage. The amp/hour capacity of the two batteries so formed is dependent on the number of frames carrying the active material on each side of the barrier member. Thus the two batteries may be of equal or different capacities.

It will be appreciated that the present invention provides the ability to construct as an integral unit two batteries of equal voltage, that unit having effectively the same overall dimensions and weight as a single battery of the same voltage. Also the frames carrying the active material in both the two battery unit, and the single battery may be the same. The only significant additional component required is the barrier member. A comparable result may not be achieved by previously well known multi-cell battery constructions.

The multi-cell battery of the present invention has particular advantages in motor vehicles as one battery of the two battery unit may be used solely for starting the engine and energising the engine ignition, and the other used to operate the auxiliary mechanisms and lights. Accordingly in the event that any of the auxiliary mechanisms or lights are operated to an extent to fully or significantly discharge the particular battery to which they are connected, this will not affect the condition of the battery operating the engine and starter. Once the engine has been started the lights and auxiliary mechanism will receive electrical energy from the vehicle's alternator which will also commence to recharge the discharged battery.

There are many applications wherein the multi-cell battery of this invention may be used to advantage, such as pleasure boats and launches.

One practical arrangement of the battery will now be described with reference to the accompanying drawings:

In the drawings:

FIG. 1 is a perspective view of the complete multi-cell battery,

FIG. 2 is a perspective view at a right angle to the view in FIG. 1 with one battery unit assembled and part of the other battery unit exploded.

Figure 3:
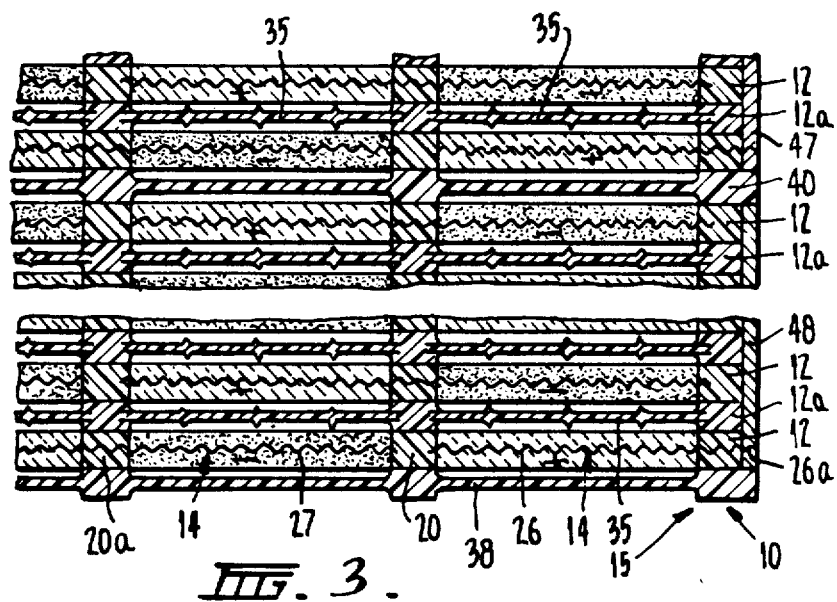
FIG. 3 is a partial sectional view along line 3—3 in FIG. 1.

Referring now to the drawings, the battery 10 comprises an assembly of frame members 12 and 12a arranged and bonded together so as to form a plurality of cells 14 separated one from the other by partitions 13 composed of the abutting vertical division elements 20 of the respective frame members 12.

Referring now to FIGS. 2 and 3, each frame member 12 and 12a comprises a perimeter member 15 having top and bottom elements 16 and 17 and opposite side elements 18 and 19. Extending between the top and bottom elements 16 and 17 are division elements 20 which are parallel to the side elements 18 and 19. The frame and the vertical division elements together define six column-like areas. The frames may be assembled in a side by side relationship secured together by the use of suitable adhesives or solvents applied to the abutting surfaces. Ultra-sonic welding may also be used to secure and seal the frames together. An assembly of a plurality of frames of this construction provides an open ended box-like structure with the internal partitions 13, the sides and top and bottom of the box being formed by the abutting side, top, and bottom elements of the frames, and the partitions 13 being formed by the abutting division elements 20.

The frames 12 which carry active battery material also include a support element 30 spaced from the top element 16 and extending between the opposite side elements 18, 19. It is to be noted that such a support element is not provided in the frames 12a, as will be referred to later.

In the active material frames 12a, grid-like structures 26, 27 are provided to the area between the respective division elements below the level of the support element 30 to provide further support for the active battery material in those areas which form active material areas in the finished battery. The grids may be formed of the same material as the remainder of the frame and moulded as an integral part thereof, but preferably is made of an electrically conductive material which is not adversely affected by the materials of the battery, such as lead alloy, and is embedded in the elements of the frame during the moulding of the frame.

In the particular frame 12 shown in FIG. 2 an edge of the grid 26 extends into the side element 18 of the frame with a portion 26a extending therethrough. The opposite edge of the grid 26 also extends into but not through the adjacent division element 20. The portion 26a of the grid 26 external of the frame provides a connection to the terminal 45 for electrically connecting the cells constituted by an assembly of frames. The grid 27 extends from said adjacent division element and is embedded in and extends through the next division element 20a. The grid 27 thus forms an intercell connector between areas of active battery material on opposite sides of the division element 20a. The grids 26 and 27 thus provide support for the active battery material, act as a current collector for the respective areas, and form intercell connectors and/or terminal connections as required in respect of cells formed by the assembly of frames. The arrangement of the grids and the resulting intercell connectors and terminal connections are described in more detail in British Pat. Nos. 1,515,688 and 1,430,205.

During the pasting of the frames the area above the upper support element 30 in each frame is not pasted so that when the frames are assembled together electrolyte reservoirs 31 are formed above the areas of active material.

The frames 12a, conveniently referred to as separator frames, carry a separator member 35 in each support area, and are positioned between the frames 12 described above carrying the active battery material. The frame 12a carrying the separator member 35 is of the same general construction as that carrying the active battery material, with the omission of the support member 30 so that gas generated in the chemical action of the battery can free rise to the reservoir 31. The separator member 35, preferably made of sheet material, is sealed about the perimeter to the perimeter member 15 and to the division elements 20 of the frame. All separator members in a single frame may be formed from a single sheet of suitable material with the frame moulded in situ on to the sheet. By suitable selection of the materials of the frame and separator the separator material is rendered non-porous where it is embedded in the division elements 20 of the frame to prevent leakage of electrolyte between adjoining cells of the finished battery via the common separator sheet. The separator may be formed of a material which will fuse under heat so that during moulding the portions of the sheet contacted by the hot frame material is fused to render it non-porous.

As described in the previously referred to British Patents in order to form a battery, a plurality of active material frames 12 are individually pasted with conventional active battery material so that the adjacent areas in each frame are of opposite polarity. Thus each active material frame forms a plurality of side by side plates of alternate positive and negative polarity. A number of these active material frames are then assembled together in a side by side relationship with a separator frame 12a between each pair and with each plate in each active material frame, adjacent a plate of opposite polarity in the adjoining active material frame. The series of cells so formed by each two adjacent frames are electrically connected in series by the grids built into the frames and have positive and negative terminal strips such as the strip 47 as shown in FIG. 1.

Although the assembly of frames will form a top, bottom and two opposite side walls, the remaining two ends provide exposed active material and the end plates 38 are secured in sealed relation to the end frames of the assembly to complete the battery case. Each end plate 38 is of the same shape as the frames 12 and 12a and includes a perimeter frame and division elements.

The areas of the end plate between the perimeter frame and the division elements are spanned by sheets of electrolyte impervious material, and may conveniently be moulded integral with the frame and division elements. These end plates are bonded or welded to the outermost frame 12 of the assembly to form a complete seal along the full perimeter and the full length of each division element.

The barrier frame 40, which is of the same construction as the end plate 38 just described, is bonded or welded to the frames 12 on either side thereof to form a complete seal along the full perimeter and the full length of each division element. The barrier frame 40 completely isolates the frames on either side thereof from one another so there is no internal electrical or chemical inter-action, thus forming two batteries 45 and 46.

It will be appreciated that although the embodiment illustrated has only one barrier frame 40, it is possible to incorporate more than one barrier frame so that a greater number of batteries of the same nominal voltage are formed within the one assembly of frames.

The respective batteries are provided with independent positive terminal strips 47 and 48 and a common negative terminal strip not shown. However in some applications it may also be desirable to provide an independent negative terminal strip 49 for each battery. Each terminal strip is provided with a threaded stud and nut assembly 50 for convenient connection into appropriate circuits.

The side elements 18 and 19 of each frame 12 and 12a are provided with a notch 18a and 19a respectively, which forms elongated shallow grooves when the frames are assembled together. The respective terminal strips are seated in the respective grooves and soldered or otherwise electrically connected to the portions of the grids that extend from the frames 12. The terminal strips are further held in position by plugs 51 of thermoplastic material extending through apertures provided in the terminal strips and bonded to the side elements of the frames.

Figure 4:
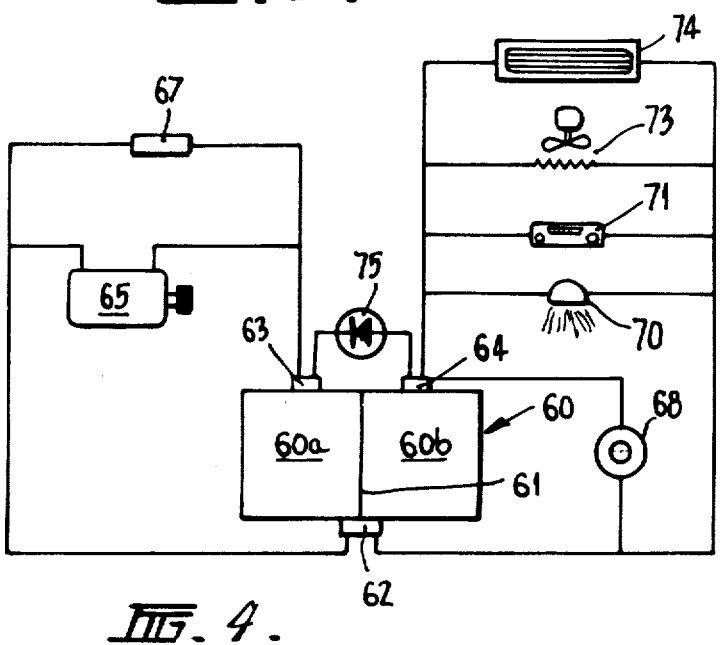
FIG. 4 is a simplified diagram of the electric system of a motor vehicle incorporating the battery shown in FIG. 1.

A typical and simplified circuit diagram of electrical system of an automobile incorporating a battery of the above construction is shown in FIG. 4.

The battery 60 is of a construction previously described having one barrier frame 61 which divides the battery into two independent units 60a and 60b, each of the same nominal voltage. The battery has a common negative terminal 62 and two positive terminals 63 and 64.

Connected across the terminals 62 and 63 are the engine starter motor 65 and the engine ignition system 67. Appropriate control switches and relays will of course be incorporated in the starter motor circuit and the ignition system, but for convenience these have been omitted from the drawing. A generator or alternator 68 with appropriate controls is also connected across the terminals 62 and 63 so that when the engine is running, a charging voltage will be applied across these terminals.

The various accessories of the motor vehicle such as lights 70, radio 71, heater 72 and air-conditioner 74 are connected in parallel across the terminals 62 and 64. It will thus be appreciated that the ignition and starter motor of the automobile derive their electrical energy from battery unit 60a whilst all of the accessories obtain their electrical energy from independent battery unit 60b. Accordingly, in the event of any of the accessories being left switched on whilst the engine is not running, energy will only be withdrawn from battery unit 60b.

The diode 75 is connected between the positive terminals 63 and 64 so that when the charging voltage is applied to terminal 63 from the generator 68, the same charging voltage will also be applied to terminal 64, however when the generator is not applying a charging voltage there can be no flow of current from terminal 64 to terminal 63.

We claim:

1. A multi-cell battery comprising:
a first assembly of frames,
a second assembly of frames, and
barrier means interposed between said first and second assemblies of frames for electrically and chemically isolating said first and second assemblies from one another;
each of said first and second assemblies of frames comprising:
a plurality of frames secured together in side by side relation, each frame of each assembly having spaced division elements defining with the perimeter of the frame a plurality of support areas arranged side by side across the width of the frame, the perimeter and division elements of the frames in the respective assemblies being secured together in sealed relation so that the perimeters form outer walls of the battery and the division elements form partitions between adjacent cells of the battery, the frame at one end of each assembly of frames having the perimeter and division elements thereof secured in sealed relation to respective opposite sides of the barrier means,
individual masses of active battery material supported in each support area of the frames in each assembly so that each support area forms a plate of the battery, the active battery material in respective areas being selected so that adjacent areas in the same frame form plates of opposite polarity and corresponding areas in adjacent frames of the same assembly form plates of opposite polarity, and
an electrolyte porous insulating separator member between the active battery material of opposite polarity in said corresponding areas, the first and second assemblies of frames thereby forming independent multi-cell batteries on opposite sides of the barrier means.

2. A multi-cell battery as claimed in claim 1 wherein said barrier means is a barrier frame having the same shape as the frames of the assemblies and portions forming divisions between adjacent support areas, said division portions being secured in sealed relationship to the division portions of the frames of the assemblies disposed on the opposite sides of said barrier frame, each area of the barrier frame formed by the division portions thereof being spanned by a sheet of material formed integral with the barrier frame.

3. A multi-cell battery as claimed in claim 2 wherein electric connector members extend through alternate division elements of the frames supporting active material, the arrangement of the connector members being such that each two adjacent frames supporting active battery material form a series connected group of cells.

* * * * *